United States Patent [19]

Knight

[11] 4,321,513
[45] Mar. 23, 1982

[54] TELEVISION RECEIVER HIGH VOLTAGE PROTECTION CIRCUIT

[75] Inventor: Peter R. Knight, Indianapolis, Ind.

[73] Assignee: RCA Corporation, New York, N.Y.

[21] Appl. No.: 185,454

[22] Filed: Sep. 8, 1980

[51] Int. Cl.³ .............................................. H01J 29/70
[52] U.S. Cl. .................................... 315/411; 358/243
[58] Field of Search .................. 315/411; 358/190, 243

[56] References Cited

U.S. PATENT DOCUMENTS 4,042,858 8/1977 Collette et al. .
4,045,742 8/1977 Meehan et al. .
4,126,816 11/1978 Willis .
4,213,166 7/1980 Watanabe .

OTHER PUBLICATIONS

RCA TV Service Data, file 1980 (CDN) C-7, Chassis CTC 101, RCA Corp., Consumer Electronics, pp. 1, 13, 38-43.
RCA TV Service Data, file 1980 C-2, Chassis 107 Series, RCA Corp. Consumer Electronics, pp. 1, 13, 14, 24-29.

*Primary Examiner*—Theodore M. Blum
*Attorney, Agent, or Firm*—Paul J. Rasmussen; William H. Meagher; Joseph Laks

[57] ABSTRACT

The retrace pulse voltage developed across a television receiver flyback transformer winding is rectified and filtered to develop a voltage representative of picture tube ultor voltage. This representative voltage is applied to an input terminal of a comparator. A beam current representative voltage, obtainable, for example, at the input of a beam limiter circuit, is applied to a filter. The filter output voltage, which is the time integration voltage of the beam current representative voltage, is applied to another input terminal of the comparator. The comparator develops a disabling signal that is utilized to disable normal television operation when the ultor voltage exceeds a magnitude which differs with different values of the filter output voltage. The beam current information from the filter output increases the comparator sensitivity to ultor voltage increases at the higher beam current levels where greater amounts of X-radiation may be produced while avoiding unnecessary disabling of television operation at the lower beam current levels where greater increases in ultor voltage may be tolerated. The time constant associated with the filter is relatively short for relatively light beam current loading conditions and is changed to a relatively long time constant value under severe beam current loading conditions in order to ascertain whether a permanent current overload condition exists that requires disabling of the television receiver.

13 Claims, 1 Drawing Figure

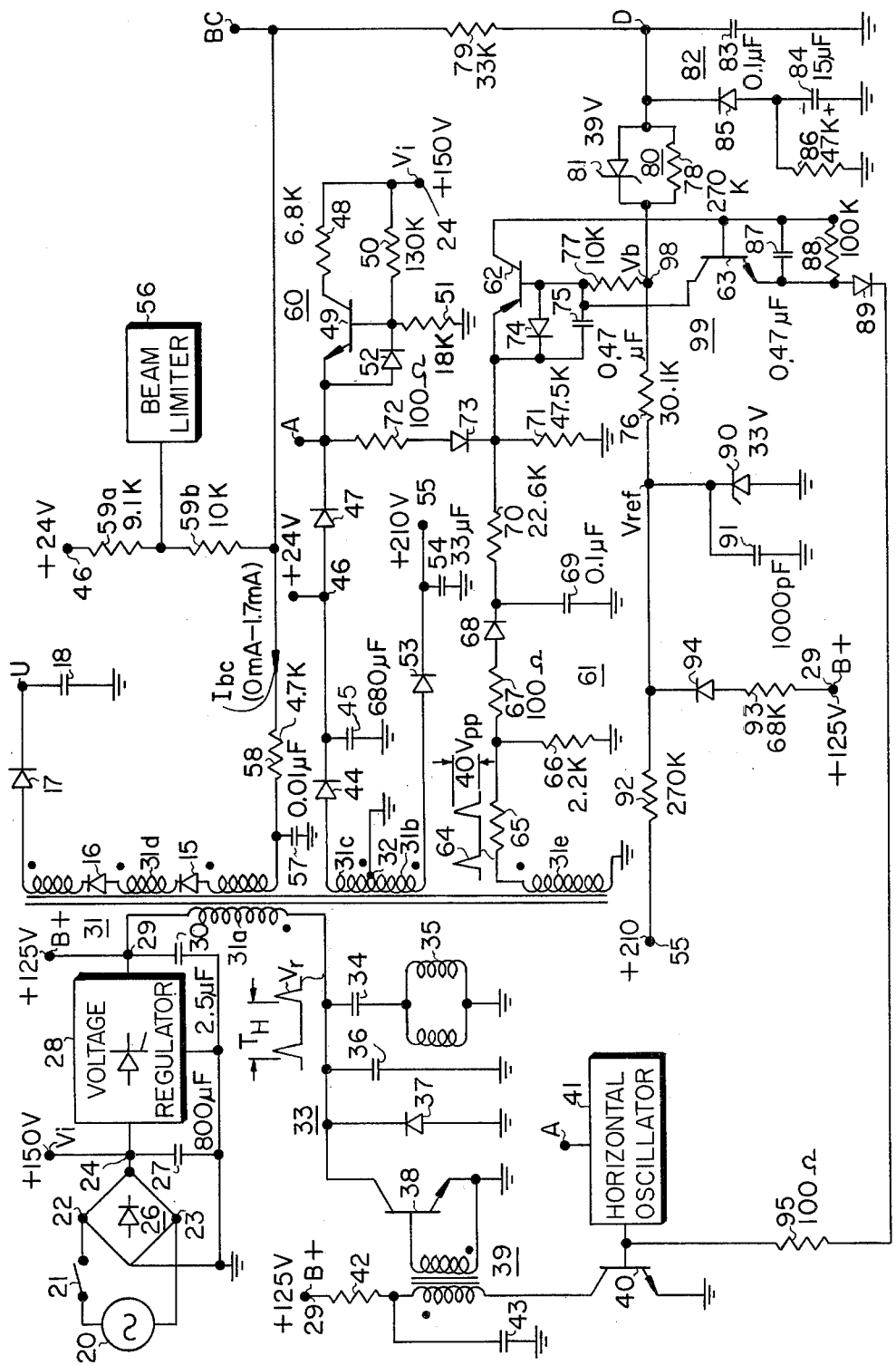

TELEVISION RECEIVER HIGH VOLTAGE PROTECTION CIRCUIT

This invention relates to high voltage protection circuits for a television display system.

In a typical television display system, a high voltage, DC ultor accelerating potential is applied to the final anode electrode of a picture tube to accelerate onto a phosphor screen an electron beam generated at the picture tube cathode. When the electron beam impinges on the phosphor particles of the phosphor screen, the phosphor particles emit radiation in the visible region. The amount of visible radiation emitted by the phosphor particles is a function of the magnitude of the accelerating potential or ultor voltage. The greater the ultor voltage, the greater the phosphor emission at a given input signal level to the cathode. Relatively large ultor voltages are desirable in order to impart a relatively high brightness to the scenes displayed on the picture tube phosphor screen. In a television receiver with a shadow mask type color picture tube, ultor voltages of 30 kilovolts may be generated.

Because the electron beams of a color picture tube are accelerated to a relatively high velocity before they impinge on the shadow mask and phosphor screen, a certain amount of X-radiation emission accompanies the emission of visible radiation by the phosphor particles. Almost all the emitted X-radiation is absorbed by the picture tube glass envelope, faceplate and adjacent metallic structures such as the magnetic shield. Under normal ultor voltage and beam current operating conditions, the amount of X-radiation not absorbed by the picture tube and adjacent structures is maintained at an extremely low level, quite insufficient to harm any bystander.

To insure that the television receiver will not be operated under fault conditions at excessive emission levels of X-radiation, a high voltage protection circuit may be incorporated in the television receiver such that an abnormal display is presented should the ultor voltage approach unacceptable levels. A characteristic curve known as an isodose curve or curve of ultor voltage versus ultor beam current may be computed for a particular television display system. Operation of the display system in the high voltage region above the isodose curve should be avoided in order to insure that the bystander is not exposed to any significant amounts of X-radiation.

The amount of X-radiation emitted is proportional to the product $(U)^m(I)^n$, where U equals the ultor voltage, I equals the ultor beam current flowing out of the ultor terminal, and m,n positive numbers. Since the amount of X-radiation emission increases with increasing ultor beam current, the isodose curve generally departs from a horizontal straight line such that at higher beam current levels, the television receiver should be operated at lower high voltage levels in order to locate the television receiver operating points in the high voltage region well below the isodose curve.

Many television receivers incorporate a high voltage protection circuit which disables normal television receiver operation should a fault condition arise wherein the ultor voltage generated approaches values which would result in high voltage operation in the region above the isodose curve. In some protection circuits, a retrace pulse voltage developed across a flyback transformer secondary winding is rectified and filtered and then applied to a comparator as an input voltage that is representative of the ultor voltage. The comparator develops a disabling signal utilized to disable normal television receiver operation should the ultor voltage as represented by the input voltage exceed a predetermined trip value.

Because the amount of X-radiation emission is a function of the beam current operating level as well as the ultor voltage operating level, the predetermined trip value of ultor voltage established by the protection circuit comparator should vary with beam current level so as to enable the comparator to develop a disabling signal at lower ultor voltages when the television receiver is operated at the higher beam current levels. At the same time, the comparator should be less sensitive to increases of ultor voltage at the lower beam current levels, where less X-radiation emission occurs in order to avoid unnecessarily disabling television receiver operation at the lower beam current levels.

To permit the predetermined ultor voltage value at which a disabling signal is developed to vary with beam current loading, a beam current representative voltage may also be applied to an input terminal of the comparator. This beam current representative voltage may be obtained from the voltage developed at the television receiver beam limiter input terminal and is applied to the comparator after filtering. Additional overcurrent sensing circuitry may be provided to enable the comparator to develop a disabling signal when an overcurrent condition exists, such as a failure of the picture tube driver circuit, a permanent short-circuiting of a picture tube electrode to ground, or a permanent grid-cathode short-circuit.

A feature of the invention is to provide filtering of the beam current representative voltage that is applied to the protection circuit comparator such that the filtered voltage will not activate the comparator when abrupt but normal changes in beam current levels occur, such as may occur during channel changes and during a scene change from a relatively bright to a relatively dark scene. Another feature is that the filtered voltage will not activate the comparator during momentary or transient picture tube arcing conditions, while still activating the comparator under permanent or long term overcurrent conditions.

In accordance with the invention, the beam current filter for the comparator input includes first and second voltage integrating networks of different time constants. The first voltage integrating network is operative to develop the filter output voltage when the time integrated beam current representative voltage is within one range of values, and the second voltage integrating network is operative to develop the filter output voltage when the voltage is within a different range of values.

In further accordance with the invention, the time constant of the first voltage integrating network is selected to be sufficiently short so as to prevent the comparator from developing a disabling signal when relatively abrupt beam current load changes from low beam current levels to high beam current levels occur under normal television display operation.

In still further accordance with the invention, the time constant of the second voltage integrating network is selected to be long enough so as to prevent substantial changes in filter output voltage from occurring during a momentary picture tube arcing condition.

In a specific embodiment of the invention, the first voltage integrating network includes a first capacitor and the second voltage integrating network includes a second capacitor and means for coupling the second capacitor across the first capacitor when the first capacitor voltage exceeds a predetermined magnitude. Such a coupling means may comprise, for example, a diode in series with the second capacitor, the series arrangement being coupled across the first capacitor.

In another specific embodiment, the protection circuit is provided with an overcurrent detection capability by applying the filter output voltage to the comparator through a variable impedance. The impedance exhibits a first value when the first output voltage is below a predetermined magnitude and exhibits a second value when the filter output voltage is above the predetermined magnitude. The variable impedance may comprise, for example, a resistor paralleled by a zener diode.

The FIGURE illustrates a deflection and high voltage generator for a television display including a high voltage disabling circuit embodying the invention.

In the FIGURE, a source of alternating polarity mains supply voltage 20 is coupled to input terminals 22 and 23 of a full-wave bridge rectifier 26. Mains supply 20 is coupled to input terminal 22 through a television receiver mechanical on/off switch 21. A filter capacitor 27 is coupled between output terminal 24 and current return or ground terminal 25 of bridge rectifier 26. A filtered, but unregulated, DC input voltage $V_i$ is developed at terminal 24.

Terminal 24 is coupled to a conventional voltage regulator 28 to develop a DC, regulated B+ supply voltage at a terminal 29. Voltage regulator 28 may comprise, for example, an SCR switching regulator operated at the horizontal deflection frequency, $1/T_H$. A filter capacitor 30 is coupled between terminal 29 and ground to substantially filter out horizontal rate ripple voltage. A relatively small valued capacitor may be used for filter capacitor 30 when compared to the value of the mains supply filter capacitor 27.

The B+ supply voltage developed at terminal 29 is applied through the primary winding 31a of a flyback transformer 31 to energize a horizontal deflection generator 33. Horizontal deflection generator 33 comprises the series arrangement of a trace or S-shaping capacitor 34 and a horizontal deflection winding 35, a retrace capacitor 36, a damper diode 37 and a horizontal output transistor 38 supplied with a horizontal rate switching signal developed by a horizontal oscillator 41, amplified by a horizontal driver transistor 40, and coupled to the horizontal output transistor 38 by a driver transformer 39. Collector supply voltage for driver transistor 40 is obtained from the B+ input terminal 29 through a resistor 42. A filter capacitor 43 is coupled to the junction of resistor 42 and the primary winding of driver transformer 39.

Horizontal deflection generator 33 and flyback transformer 31 comprise a high voltage and auxiliary DC supply voltage generating system. During normal operation of horizontal deflection generator 33, the retrace pulse voltage $V_r$, developed at the collector of horizontal output transistor 38, is applied as an exciting voltage to flyback transformer primary winding 31a to develop retrace pulse voltage across flyback transformer output windings 31b–31e. Flyback transformer output winding 31d comprises a three sectioned high voltage winding. The retrace pulse voltages developed across the three sections are rectified by respective diodes 15–17 and filtered by a capacitor 18 to develop a DC ultor voltage or accelerating potential for beam current at a terminal U that is connected to the ultor of a television receiver picture tube, not illustrated. Filter capacitor 18 may comprise the capacitance between the inner and outer conductive coatings that are disposed on the picture tube envelope.

The voltage developed across flyback transformer winding 31b rectified by a diode 53 during the retrace interval of a deflection cycle and filtered by a capacitor 54 a develop a DC auxiliary supply voltage at a terminal 55, illustrative of +210 volts DC. The +210 volt supply powers such television receiver load circuits as the picture tube video driver circuit, not illustrated in the FIGURE. The voltage developed across flyback transformer output winding 31c is rectified by a diode 44 during the trace interval of a deflection cycle and filtered by a capacitor 45 to develop a DC auxiliary supply voltage at terminal 46 of, illustratively, +24 volts DC. The +24 volt DC supply powers such television receiver circuits as the audio circuit and the vertical deflection circuit, neither circuit being illustrated in the FIGURE.

During steady-state television receiver operation, a diode 47 is forward biased to apply the +24 volts developed at terminal 46 to a terminal A to energize horizontal oscillator 41. During start-up of television receiver operation immediately after the initial closure of mechanical on/off switch 21, no voltage is present at terminal A of horizontal oscillator 41.

A start-up supply 60 is coupled to terminal A to provide a start-up supply voltage to horizontal oscillator 41. The unregulated DC input voltage $V_i$ developed at terminal 24 after closure of mechanical on/off switch 21 is applied to voltage regulator 28 to develop voltage at B+ input terminal 29. The voltage $V_i$ is also applied to the base of a start-up transistor 49 through a resistor 50 of a voltage divider comprising resistor 50 and a resistor 51 and is applied to the collector of start-up transistor 49 through a resistor 48. A reverse voltage protection diode 52 is coupled between the base and emitter electrodes of transistor 49.

During television start-up, the DC voltage $V_i$ forward biases transistor 49 into conducting current from terminal 24 to terminal A and from there to horizontal oscillator 41 to initiate and maintain operation of the oscillator during the start-up interval. Diode 47 is reverse biased to prevent shunting of current from transistor 49 to any load other than oscillator 41.

With horizontal oscillator 41 becoming operative, horizontal output transistor 38 begins the switching action needed to develop the retrace pulse voltage $V_r$. Once the retrace pulse voltage $V_r$ is developed, DC voltages are developed at auxiliary supply terminals 46 and 55 to power the various television receiver load circuits coupled thereto.

The voltage developed by start-up supply 60 at the emitter of transistor 49 during the start-up interval is selected to be great enough to enable horizontal oscillator 41 to begin oscillations but less than the DC voltage that is developed at terminal 46 once steady-state operation ensues. Thus, during steady-state operation, diode 47 becomes forward biased and applies the +24 volt DC voltage to terminal A and the emitter of start-up transistor 49. Transistor 49 becomes reverse biased during steady-state television receiver operation, disabling the start-up supply 60.

A high voltage disabling circuit 61 senses the ultor voltage as represented by the retrace pulse voltage 64 developed across a flyback transformer winding 31e and provides a disabling signal at the collector of a comparator transistor 62. The output of a latch 99, comprising comparator transistor 62 and a transistor 63, is coupled through a diode 89 and a resistor 95 to the base of horizontal driver transistor 40 of horizontal deflection generator 33. The disabling signal developed at the collector of comparator transistor 62 is utilized to activate latch 99 to disable normal television display operation.

The retrace pulse voltage 64 developed across flyback transformer winding 31e is divided by voltage dividing resistors 65 and 66, rectified and filtered by a resistor 67, a diode 68 and a capacitor 69, and applied to the emitter input electrode of comparator transistor 62 through a resistor 70 of a voltage divider comprising resistor 70 and a resistor 71. The voltage $V_b$ developed at a comparator input terminal 98 is applied to the base electrode of comparator transistor 62 through a resistor 77. The anode of a diode 74 is coupled to the base of transistor 62 and the cathode of diode 74 is coupled to the emitter.

Under normal television receiver operation, the amplitude of retrace pulse voltage 64 is low enough to enable the voltage $V_b$ developed at comparator input terminal 98 to forward bias diode 74 into conduction, thereby maintaining comparator transistor 62 reverse biased. Under a fault operating condition such as operation of the television receiver with a faulty voltage regulator, the ultor voltage may increase to undesirably large levels. The undesirable increase in ultor voltage is sensed as an increase in the amplitude of retrace pulse voltage 64. When the ultor voltage has increased above a predetermined threshold value above which it is desirable to disable normal television receiver operation, the emitter voltage of comparator 62 has become sufficiently greater than the voltage $V_b$ at comparator input terminal 98 to reverse bias diode 74 and forward bias transistor 62 into conduction. Collector current from transistor 62 turns on transistor 63, thereby energizing latch 99.

Current flowing from the emitter of transistor 63 flows to the base of horizontal driver transistor 40, maintaining the driver transistor continuously conducting so long as latch 99 is energized. With horizontal driver transistor 40 continuously conducting, horizontal output transistor 38 is maintained in a reverse bias state, disabling horizontal generator 33. The retrace pulse voltage $V_r$ is no longer being developed and applied to flyback transformer primary winding 31a, and flyback pulse voltages are no longer being developed across high voltage winding 31d, thereby removing the ultor voltage from terminal U.

When horizontal deflection generator 33 is shut down by disabling circuit 61, the retrace pulse voltage 64 developed across flyback transformer winding 31e is removed. To insure the shutdown of television receiver operation once the disabling circuit 61 is activated, sustaining current for latch 99 is provided at the emitter of comparator transistor 62 from terminal A through a resistor 72 and a diode 73. Thus, even when retrace pulse voltage 64 is removed after shutdown of horizontal deflection generator 33, latch 99 remains energized by the sustaining current flowing from terminal A. The sustaining current at terminal A is obtained from start-up circuit 60 which becomes reenergized after the voltage at supply terminal 46 goes to zero due to the absence of retrace pulse voltages across flyback transformer secondary winding 31c.

Disabling circuit 61 may be deenergized by opening mechanical on/off switch 21. When filter capacitor 27 becomes sufficiently discharged to be unable to supply sufficient sustaining current, latch 99 and disabling circuit 61 become deenergized. If the abnormal television receiver operation is nonrecurrent, reclosure of on/off switch 21 resumes normal television receiver operation.

A capacitor 75 is coupled across the base and emitter electrodes of transistor 62 and a capacitor 87 is coupled across the base and emitter electrodes of transistor 63 to prevent ground loop currents and RFI pickup during momentary picture tube arcing from erroneously energizing latch 99. A resistor 88 coupled across the base and emitter electrodes of transistor 63 functions to insure that capacitor 87 has no charge under normal operating conditions.

The ultor voltage threshold level above which it is desired to energize disabling circuit 61 under fault operating conditions is a function of the amount of beam current being drawn from ultor terminal U. Because the production of X-radiation is a function of beam current magnitude, disabling circuit 61 is made more sensitive to energization with ultor voltage increases at the high beam current levels than at the low beam current levels. To accomplish this result, the voltage at comparator input terminal 98 varies with beam current level variations.

Two voltages are applied to comparator input terminal 98. The first is a reference voltage $V_{ref}$ developed across a zener diode 90 and applied to terminal 98 through a resistor 76. A bypass capacitor 91 is coupled across zener diode 90. The second is a beam current information voltage developed at a terminal D, at the output of a beam current filter 82. The filter output voltage is applied to input terminal 98 through a variable impedance 80 comprising the parallel arrangement of a resistor 78 and a zener diode 81.

Beam current filter 82 includes a resistor 79 coupled between terminal D and a terminal BC and a voltage integrating capacitor 83, and includes the series arrangement of a second voltage integrating capacitor 84 and a diode 85, the series arrangement being coupled across capacitor 83. A resistor 86 is coupled across capacitor 84. Terminal BC is coupled to the input of a conventional beam limiter circuit 56 at the junction of voltage dividing resistors 59a and 59b. The DC path for beam current flowing out of ultor terminal U is from terminal BC through a resistor 58 to the bottom of high voltage winding 31d. A horizontal rate bypass capacitor 57 is coupled between the bottom of high voltage winding 13d and ground.

The voltage at terminal BC is a function of the beam current drawn from terminal U, with an increase in beam current resulting in a decrease in the voltage being developed at terminal BC. Beam limiter 56 is responsive to the beam current representative voltage developed at terminal BC and operates in a conventional manner to limit the maximum amount of beam current that may be drawn under normal operating conditions at the high brightness levels.

Beam current filter 82 comprises first and second voltage integrating circuits having different time constants of integration. The first voltage integrating circuit comprises capacitor 83 and resistors 59 and 79. Under normal beam current loading, the filter output voltage at terminal D is developed across capacitor 83 and represents the time integration voltage of the beam current representative voltage at terminal BC. Under normal beam current loading, the time integration or filter output voltage at terminal D remains above zero, reverse biasing diode 85. A second voltage integrating circuit that includes capacitor 84 and resistor 86 is decoupled from terminal D by the reverse biased diode 85.

The filter output voltage developed at terminal D is attenuated by resistor 78 of variable impedance 80 and applied to comparator input terminal 98 to vary the sensitivity of disabling circuit 61 to energization as a function of beam current loading as determined by the filter output voltage. Greater beam current loading, for example, results in a decreased voltage being developed at comparator input terminal 98. The threshold voltage that the ultor voltage must exceed before comparator transistor 62 becomes conductive is lower for the greater beam current loading condition. At the lower beam current loading level, a larger ultor voltage threshold must be exceeded before disabling circuit 61 is energized, thereby avoiding the erroneous disabling of television receiver operation at the lower beam current loading levels. Comparator 62 therefore develops its disabling signal when the ultor voltage exceeds a predetermined magnitude that differs with different values of filter output voltage.

To avoid activation of disabling circuit 61 when the television receiver is first turned on and when the television receiver is turned off with the opening of on/off switch 21, bias current for zener diode 90 is obtained from both the B+ input terminal 29 and the +210 volt auxiliary supply terminal 55.

Upon closure of on/off switch 21, during start-up, voltage is developed at B+ input terminal 29. Bias current is supplied to zener diode 90 through a resistor 93 and a diode 94 to develop the voltage $V_{ref}$ that is applied to comparator input terminal 98. A positive voltage is developed at the base of comparator transistor 62 before the retrace pulse voltage 64 attains amplitudes significant enough to forward bias comparator transistor 62. Erroneous energization of disabling circuit 61 is avoided.

During steady-state, normal television receiver operation, after the +210 volts has been developed, bias current for zener diode 90 is supplied from terminal 55 through a resistor 92. This additional bias current supply from terminal 55 is needed when on/off switch 21 is opened upon television receiver turnoff. When the television receiver is turned off, the voltage at B+ terminal 29 decays rapidly because of the relatively low value of filter capacitor 30. The voltage at the +210 volt supply terminal 55 does not decay as rapidly. Thus, bias current for zener diode 90 will flow from terminal 55 to insure that a positive voltage will be applied to the base electrode of comparator 62 during television receiver turnoff even though the B+ terminal 29 bias voltage source has been removed. The amount of loading by all the television receiver loads coupled to auxiliary supply terminal 55 is sufficiently light to enable the base voltage of comparator transistor 62 to decay more slowly than the emitter voltage during television receiver turnoff. Erroneous energization of disabling circuit 61 during turnoff is avoided.

Some television receivers include video blanking circuitry to blank the picture tube raster display during channel changeover. If the previous channel's displayed picture were a high brightness scene, the changeover would result in an abrupt beam current load change from a high beam current load level to video blanking beam current cutoff. Because of the reduced loading on ultor terminal U during channel changeover, the retrace pulse amplitude increases relatively rapidly to the no-load amplitude level. This relatively rapid no-load retrace pulse amplitude level is observed as a correspondingly rapid increase in the voltage at the emitter of comparator transistor 62. To prevent comparator 62 from erroneously developing a disabling signal for relatively abrupt beam current load changes that may occur under normal television display operation, the design of beam current filter 82 is such as to permit the voltage at comparator input terminal 98 to also increase relatively rapidly when the beam current loading changes from a high loading level to a low loading level.

The time constant associated with capacitor 83 of the first voltage integrating circuit is selected of sufficiently low or short value as to enable the comparator input terminal voltage $V_b$ to follow the increase in comparator emitter voltage produced by the unloading of ultor terminal U. Typically, a time constant of several milliseconds is sufficient to avoid erroneous television receiver disabling during channel changeover or during scene changeover where a relatively long duration, high brightness scene abruptly changes to a relatively long duration, low brightness scene.

The time constant of the first integrating circuit of beam current filter 82 cannot be made too low since it is desirable to filter out from the voltage being developed at terminal D the normal higher frequency voltage fluctuations produced at terminal BC by typical scene content brightness differences such as may exist between one area of a raster and another area of the same raster, or that may exist in the display of on-screen alpha-numeric information. Filtering out of these beam current fluctuations is desirable in order to prevent the high brightness portions of the fluctuation from decreasing the voltage $V_b$ at comparator input terminal 98 enough to erroneously turn on comparator 62 during the normal high brightness portions of the beam current fluctuations.

Variable impedance 80 provides disabling circuit 61 with an overcurrent shutdown capability to disable deflection generator 33 under permanent or long duration beam current overload conditions. Such a permanent overload condition may occur when a picture tube electrode is permanently short-circuited, or when the grid and cathode electrodes are permanently shorted to each other, or when a failure in the video drive circuit causes the picture tube cathode electrode to be overdriven. In a permanent overload condition, the beam current filter output voltage at terminal D is substantially decreased. The voltage applied across variable impedance 80 is sufficiently great to break down zener diode 81 into conduction and apply the filter output voltage at terminal D directly to comparator input terminal 98 without attenuation. Once the values of beam current exceed a predetermined magnitude for a relatively long duration, an indication of a permanent overload condition, and once zener diode 81 is in reverse breakdown conduction, comparator transistor 62 becomes forward biased in substantial independence of the voltage being developed at the comparator emitter electrode and thus in substantial independence of the ultor voltage values. To provide this overcurrent shutdown capability, variable impedance 80 is made to exhibit a higher impedance when beam current loading is relatively low and is made to exhibit a lower impedance value when the long-term beam current loading is relatively high.

Beam current loading will increase substantially under a momentary or transitory picture tube arcing condition which typically lasts for several tens of milliseconds. Such a transitory high beam current loading, although generally undesirable, is not of sufficiently long duration to require the shutdown of normal television operation. It is desirable, therefore, to design disabling circuit 61 to be responsive to long-term overcurrent conditions, but not to short-term overcurrent conditions. If beam current filter 82 were designed to have only a relatively short time constant of integration, the filter output voltage would be unable to filter out voltage changes at terminal D that were caused by transitory picture tube arcing. Disabling circuit 61 would then be erroneously activated by transitory picture tube arcing.

A feature of the invention is to provide disabling circuit 61 with a long-term overload shutdown capability while still enabling the disabling circuit to be unresponsive to momentary overloads. Beam current filter 82 is designed to incorporate a second voltage integrating circuit including a capacitor 84 and a resistor 86 decoupled from the first voltage integrating circuit of capacitor 83 by a diode 85.

Under a sustained heavy beam current loading condition, the first voltage integrating circuit integrates the beam current representative voltage developed at terminal BC into a voltage across capacitor 83 that is of reduced value when compared with the integrated voltages developed under average or light beam current loading. If the loading is sufficiently heavy and sustained sufficiently long, the voltage at terminal D becomes negative, forward biasing diode 85 and coupling capacitor 84 in parallel with capacitor 83. The value of capacitor 84 is selected to be relatively much greater than the value of capacitor 83. Therefore, under heavy sustained beam current loading, when diode 85 becomes forward biased, the capacitance value of the second integrating circuit is essentially established by the value of capacitor 84. The time constant of the second integrating circuit is selected to be substantially longer than the time constant of the first integrating circuit on the order of several hundred milliseconds, for example.

The second voltage integrating circuit, once it begins operation after the forward biasing of diode 85, continues the voltage integration of the heavy, sustained beam current representative voltage. The value of the relatively long time constant of the second voltage integrating circuit is selected so that transitory or momentary picture tube arcing will be integrated out and will be unable to produce a filter output voltage at terminal D that is much more negative than one diode drop below ground. A filter output voltage of one diode drop below ground is insufficient to break down zener diode 81 and insufficient to activate disabling circuit 61.

If the heavy, sustained overload condition persists for several hundred milliseconds, for example, an indication of a permanent or long duration overload condition, the second voltage integrating circuit has sufficient time to develop a voltage across capacitor 84 that is sufficiently negative to result in reverse breakdown of zener diode 81 and in the activation of disabling circuit 61 for overcurrent shutdown protection. Resistor 86, coupled across capacitor 84, functions to discharge the capacitor when the overload condition has subsided or after television receiver shutdown has occurred.

Otherwise explained, the time constant associated with filter 82 is relatively short for relatively light beam current loading, but is changed to a relatively long one under severe beam current loading in order to ascertain the existence of a permanent current overload condition. If such a severe overload is detected, latch 99 is energized to disable normal television display.

I claim:

1. A disabling circuit for a television display system having a high voltage generator that develops a picture tube ultor voltage, comprising:

a high voltage generator for developing a picture tube ultor voltage;

means for developing a voltage representative of said ultor voltage;

means for developing a voltage representative of picture tube beam current;

a filter including a first voltage integrating means and a second voltage integrating means having a time constant longer than the time constant of said first voltage integrating means;

means for applying said beam current representative voltage to said filter to develop a filter output voltage representative of the time integration voltage of said beam current representative voltage, said first voltage integrating means operative to develop said time integration voltage when the time integration of said beam current representative voltage is within one range of values;

means coupled to said second, longer time constant, voltage integrating means for activating said second voltage integrating means when the time integration of said beam current representative voltage is within a different range of values indicative of a beam current overload condition that requires the disablement of normal television display system operation, said second voltage integrating means operative to develop said time integration voltage once activated;

a comparator;

means for applying said ultor voltage representative voltage to said comparator;

means for applying said filter output voltage to said comparator, said comparator developing a disabling signal when said ultor voltage exceeds a magnitude that differs with different values of said filter output voltage; and means coupled to said comparator for utilizing said disabling signal to disable normal television display system operation.

2. A circuit according to claim 1 wherein said first voltage integrating means includes a first capacitor and said second voltage integrating means includes a second capacitor and wherein said activating means couples said second capacitor across said first capacitor when the voltage developed across said first capacitor exceeds a predetermined magnitude.

3. A circuit according to claim 2 wherein said activating means comprises a diode that is series arranged with said second capacitor, the series arrangement being coupled across said first capacitor.

4. A circuit according to claim 2 wherein said filter output voltage applying means comprises a variable impedance exhibiting a first impedance value when said filter output voltage is below a predetermined magnitude and exhibiting a second impedance value when said filter output voltage is above said predetermined magnitude.

5. A circuit according to claim 4 wherein said variable impedance comprises a resistance in parallel with a zener diode.

6. A circuit according to claim 1 wherein said filter output voltage applying means enables said comparator to develop said disabling signal at values of beam current above a predetermined magnitude in substantial independence of the value assumed by said ultor voltage.

7. A circuit according to claims 1, 2 or 6 wherein the time constant of said second voltage integrating means is long enough to prevent said comparator from developing said disabling signal during a momentary picture tube arcing condition.

8. A circuit according to claim 7 wherein the time constant of said first voltage integrating means is selected to be sufficiently short to prevent said comparator from developing said disabling signal for relatively abrupt beam current load changes from high beam current levels to low beam current levels that occur under normal television display operation.

9. A circuit according to claim 8 wherein the time constant of said second voltage integrating means is several hundred milliseconds and wherein the time constant of said first voltage integrating means is several milliseconds.

10. A circuit according to claim 8 wherein said high voltage generator comprises a source of exciting voltage and a transformer including a primary winding coupled to said exciting voltage source and a high voltage winding coupled to a high voltage circuit for developing said ultor voltage, a third winding of said transformer comprising said ultor voltage representative voltage developing means.

11. A circuit according to claim 10 wherein said ultor voltage representative voltage applying means comprises means coupled to said transformer third winding and to said comparator for rectifying and filtering the voltage developed across said third winding.

12. A circuit according to claim 10 wherein said transformer comprises a flyback transformer and said source of exciting voltage comprises a deflection generator applying a retrace pulse voltage as said exciting voltage to said flyback transformer primary winding for developing retrace pulse voltages across said high voltage and third windings.

13. A circuit according to claim 12 wherein said utilizing means comprises a latch coupled to said deflection generator, said latch being activated by said disabling signal to disable normal deflection generator operation.

* * * * *